| (12) | United States Patent | (10) Patent No.: | US 11,055,630 B2 |
|---|---|---|---|
| | Crabtree et al. | (45) Date of Patent: | Jul. 6, 2021 |

(54) MULTITEMPORAL DATA ANALYSIS

(71) Applicant: QOMPLX, Inc., Tysons, VA (US)

(72) Inventors: Jason Crabtree, Vienna, VA (US); Andrew Sellers, Monument, CO (US)

(73) Assignee: QOMPLX, Inc., Tysons, VA (US)

( * ) Notice: Subject to any disclaimer, the term of this patent is extended or adjusted under 35 U.S.C. 154(b) by 900 days.

(21) Appl. No.: 15/790,206

(22) Filed: Oct. 23, 2017

(65) Prior Publication Data

US 2018/0181537 A1 Jun. 28, 2018

Related U.S. Application Data

(63) Continuation-in-part of application No. 15/616,427, filed on Jun. 7, 2017, which is a continuation-in-part
(Continued)

(51) Int. Cl.
*G06N 5/02* (2006.01)
*G06N 20/00* (2019.01)
*G06F 16/90* (2019.01)
*G06F 16/25* (2019.01)
*H04L 29/08* (2006.01)

(52) U.S. Cl.
CPC ........... *G06N 20/00* (2019.01); *G06F 16/252* (2019.01); *G06F 16/90* (2019.01); *G06N 5/022* (2013.01); *H04L 67/10* (2013.01)

(58) Field of Classification Search
CPC ........ G06N 5/02; G06N 5/022; G06F 16/252; G06F 16/90
See application file for complete search history.

(56) References Cited

U.S. PATENT DOCUMENTS 6,256,544 B1 7/2001 Weissinger
2010/0281166 A1* 11/2010 Buyya ................... G06F 9/5072
709/226
(Continued)

FOREIGN PATENT DOCUMENTS

WO 2014159150 A1 10/2014
WO 2017075543 A1 5/2017

OTHER PUBLICATIONS

Elnikety, Eslam, Tamer Elsayed, and Hany E. Ramadan. "iHadoop: asynchronous iterations for MapReduce." 2011 IEEE Third International Conference on Cloud Computing Technology and Science. IEEE, 2011. (Year: 2011).*

*Primary Examiner* — Hal Schnee
(74) *Attorney, Agent, or Firm* — Galvin Patent Law LLC; Brian R. Galvin; Brian S. Boon

(57) ABSTRACT

A system for multitemporal data analysis is provided, comprising a directed computation graph service module configured to receive input data from a plurality of sources, analyze the input data to determine a best course of action for analyzing the input data, and split the input data for queueing to a general transformer service module or a decomposable service module based at least in part by analysis of the input data; a general transformer service module configured to receive data from the directed computation graph service module, and perform analysis on the received data; and a general transformer service module configured to receive data from directed computational graph module, and perform analysis on the received data.

12 Claims, 9 Drawing Sheets

Related U.S. Application Data of application No. 14/925,974, filed on Oct. 28, 2015, now abandoned.

(60) Provisional application No. 62/569,362, filed on Oct. 6, 2017.

(56) References Cited

U.S. PATENT DOCUMENTS

| | | | |
|---|---|---|---|
| 2011/0154341 A1* | 6/2011 | Pueyo | G06F 9/5066 718/101 |
| 2016/0275123 A1 | 9/2016 | Lin et al. | |
| 2016/0342606 A1* | 11/2016 | Le Mouel | G06F 16/2465 |
| 2017/0083380 A1* | 3/2017 | Bishop | G06F 9/5083 |

* cited by examiner

MULTITEMPORAL DATA ANALYSIS

CROSS-REFERENCE TO RELATED APPLICATIONS

This application claims priority to U.S. provisional patent application 62/569,362 titled "MULTITEMPORAL DATA ANALYSIS", filed on Oct. 6, 2017, and is also a continuation-in-part of U.S. patent application Ser. No. 15/616,427 titled "RAPID PREDICTIVE ANALYSIS OF VERY LARGE DATA SETS USING AN ACTOR-DRIVEN DISTRIBUTED COMPUTATIONAL GRAPH", filed on Jun. 7, 2017, which is a continuation-in-part of U.S. patent application Ser. No. 14/925,974 titled "RAPID PREDICTIVE ANALYSIS OF VERY LARGE DATA SETS USING THE DISTRIBUTED COMPUTATIONAL GRAPH", filed on Oct. 28, 2015, the entire specification of which is incorporated herein by reference.

BACKGROUND OF THE INVENTION

Field of the Invention

The disclosure relates to the field of machine learning, particularly to general and decomposable data analysis.

Discussion of the State of the Art

Data analysis may often be required to be done on massive amounts of data. Even though the data may be labeled in one form or another, the data may not have a uniform format since it may originate from different sources, or the data may contain a lot of irrelevant data which may need to be formalized for maximum analysis efficiency. The data may also contain elements that may be better suited for other means of analysis that is not provided by the current system. Creating a data analysis model from scratch may be daunting, and manually curating such large amounts of data may prove to be a tedious and time-consuming task.

Another trend that is growing in popularity is the concept of a serverless application, in which a developer does not have to create a backend server infrastructure for their application. The developer may user a Platform as a Service (PaaS) solution such as AMAZON LAMBDA to simplify their backend requirements. Unlike analyzing large amounts of data, a serverless application may require a system with real-time streaming data-handling capabilities. The computer systems used may differ as well, since a system well-suited for analyzing large amounts of data may be not able to analyze real-time streaming data.

Therefore, what is needed is a system that can programmatically analyze both large amounts of stored data, or streams of real-time data. Such a system should allow a user to easily create, share, and distribute data analysis models. Such a system should also be flexible, and able to be used in many applications.

SUMMARY OF THE INVENTION

Accordingly, the inventor has conceived, and reduced to practice, a system and method for multitemporal data analysis.

In a typical embodiment, a system is provided in which data may be input into a system by a user. The system determines the best course for analyzing the data, which may include, without limitation, mapping and reducing the data, splitting general and decomposable data, and directed computation graph analysis. The data that may be put into the system may include, without limitation, large and small amounts of stored data, live streaming data, and the like.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
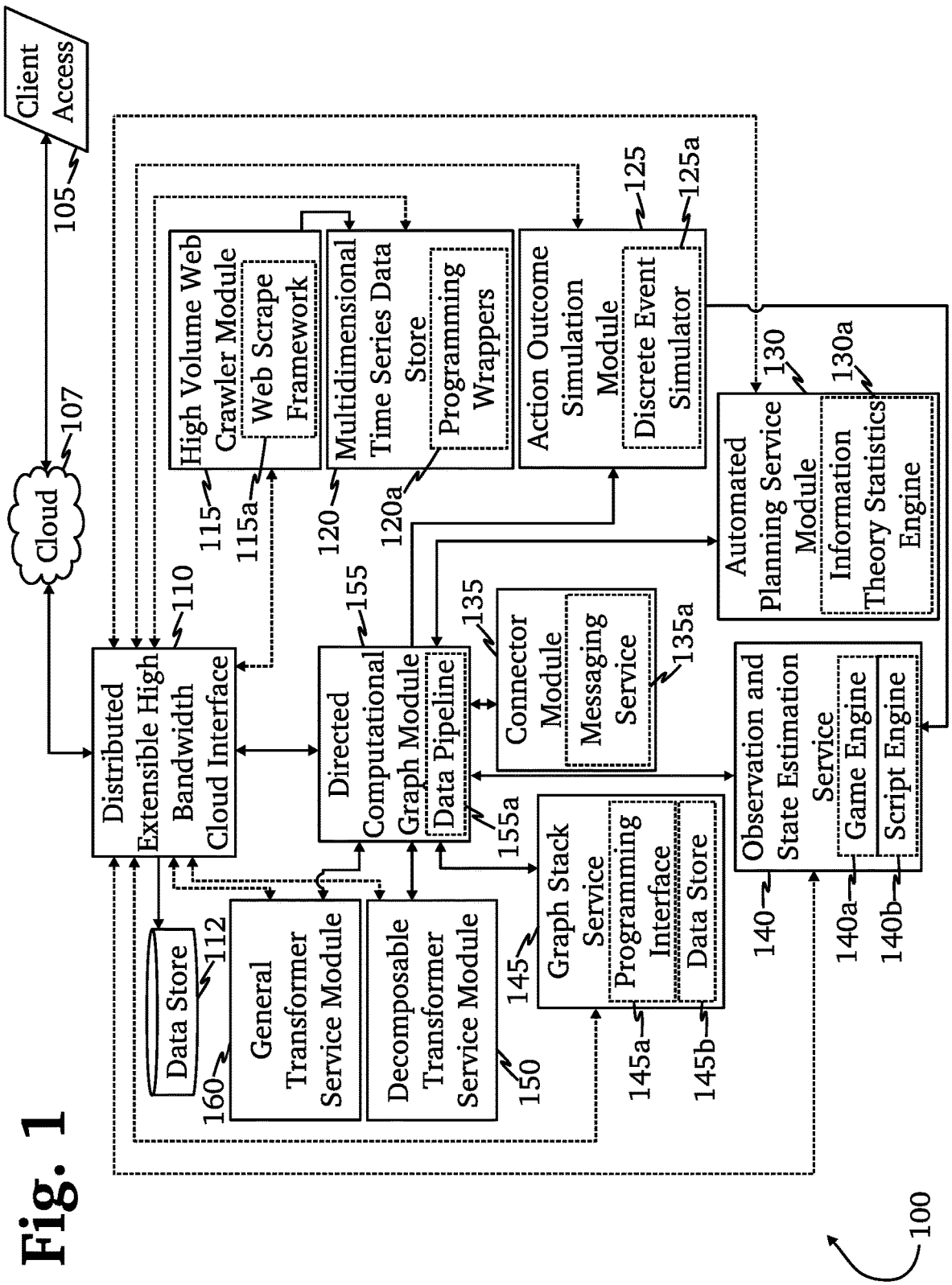
FIG. 1 is a diagram of an exemplary architecture of a business operating system according to an embodiment of the invention.

The inventor has conceived, and reduced to practice, a system and method for multitemporal data analysis.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a diagram of an exemplary architecture of a business operating system 100 according to an embodiment of the invention. Client access to system 105 for specific data entry, system control and for interaction with system output such as automated predictive decision making and planning and alternate pathway simulations, occurs through the system's distributed, extensible high bandwidth cloud interface 110 which uses a versatile, robust web application driven interface for both input and display of client-facing information and a data store 112 such as, but not limited to MONGODB™, COUCHDB™, CASSANDRA™ or REDIS™ depending on the embodiment. Much of the business data analyzed by the system both from sources within the confines of the client business, and from cloud based sources 107, public or proprietary such as, but not limited to: subscribed business field specific data services, external remote sensors, subscribed satellite image and data feeds and web sites of interest to business operations both general and field specific, also enter the system through the cloud interface 110, data being passed to the connector module 135 which may possess the API routines 135a needed to accept and convert the external data and then pass the normalized information to other analysis and transformation components of the system, the directed computational graph module 155, high volume web crawler module 115, multidimensional time series database 120 and a graph stack service 145. Directed computational graph module 155 retrieves one or more streams of data from a plurality of sources, which includes, but is not limited to, a plurality of physical sensors, network service providers, web based questionnaires and surveys, monitoring of electronic infrastructure, crowd sourcing campaigns, and human input device information. Within directed computational graph module 155, data may be split into two identical streams in a specialized pre-programmed data pipeline 155a, wherein one sub-stream may be sent for batch processing and storage while the other sub-stream may be reformatted for transformation pipeline analysis. The data may be then transferred to a general transformer service module 160 for linear data transformation as part of analysis or the decomposable transformer service module 150 for branching or iterative transformations that are part of analysis. Directed computational graph module 155 represents all data as directed graphs where the transformations are nodes and the result messages between transformations edges of the graph. High-volume web crawling module 115 may use multiple server hosted preprogrammed web spiders which, while autonomously configured, may be deployed within a web scraping framework 115a of which SCRAPY™ is an example, to identify and retrieve data of interest from web based sources that are not well tagged by conventional web crawling technology. Multiple dimension time series data store module 120 may receive streaming data from a large plurality of sensors that may be of several different types. Multiple dimension time series data store module 120 may also store any time series data encountered by system 100 such as, but not limited to, environmental factors at insured client infrastructure sites, component sensor readings and system logs of some or all insured client equipment, weather and catastrophic event reports for regions an insured client occupies, political communiques and/or news from regions hosting insured client infrastructure and network service information captures (such as, but not limited to, news, capital funding opportunities and financial feeds, and sales, market condition), and service related customer data. Multiple dimension time series data store module 120 may accommodate irregular and high-volume surges by dynamically allotting network bandwidth and server processing channels to process the incoming data. Inclusion of programming wrappers 120a for languages—examples of which may include, but are not limited to, C++, PERL, PYTHON, and ERLANG™—allows sophisticated programming logic to be added to default functions of multidimensional time series database 120 without intimate knowledge of the core programming, greatly extending breadth of function. Data retrieved by multidimensional time series database 120 and high-volume web crawling module 115 may be further analyzed and transformed into task-optimized results by directed computational graph 155 and associated general transformer service 160 and decomposable transformer service 150 modules. Alternately, data from the multidimensional time series database and high-volume web crawling modules may be sent, often with scripted cuing information determining important vertices 145a, to graph stack service module 145 which, employing standardized protocols for converting streams of information into graph representations of that data, for example open graph internet technology (although the invention is not reliant on any one standard). Through the steps, graph stack service module 145 represents data in graphical form influenced by any pre-determined scripted modifications 145a and stores it in a graph-based data store 145b such as GIRAPH™ or a key-value pair type data store REDIS™, or RIAK™, among others, any of which are suitable for storing graph-based information.

Results of the transformative analysis process may then be combined with further client directives, additional business rules and practices relevant to the analysis and situational information external to the data already available in automated planning service module 130, which also runs powerful information theory-based predictive statistics functions and machine learning algorithms 130a to allow future trends and outcomes to be rapidly forecast based upon the current system derived results and choosing each a plurality of possible business decisions. Then, using all or most available data, automated planning service module 130 may propose business decisions most likely to result in favorable business outcomes with a usably high level of certainty. Closely related to the automated planning service module 130 in the use of system-derived results in conjunction with possible externally supplied additional information in the assistance of end user business decision making, action outcome simulation module 125 with a discrete event simulator programming module 125a coupled with an end user-facing observation and state estimation service 140, which is highly scriptable 140b as circumstances require and has a game engine 140a to more realistically stage possible outcomes of business decisions under consideration, allows business decision makers to investigate the probable outcomes of choosing one pending course of action over another based upon analysis of the current available data.

Figure 2:
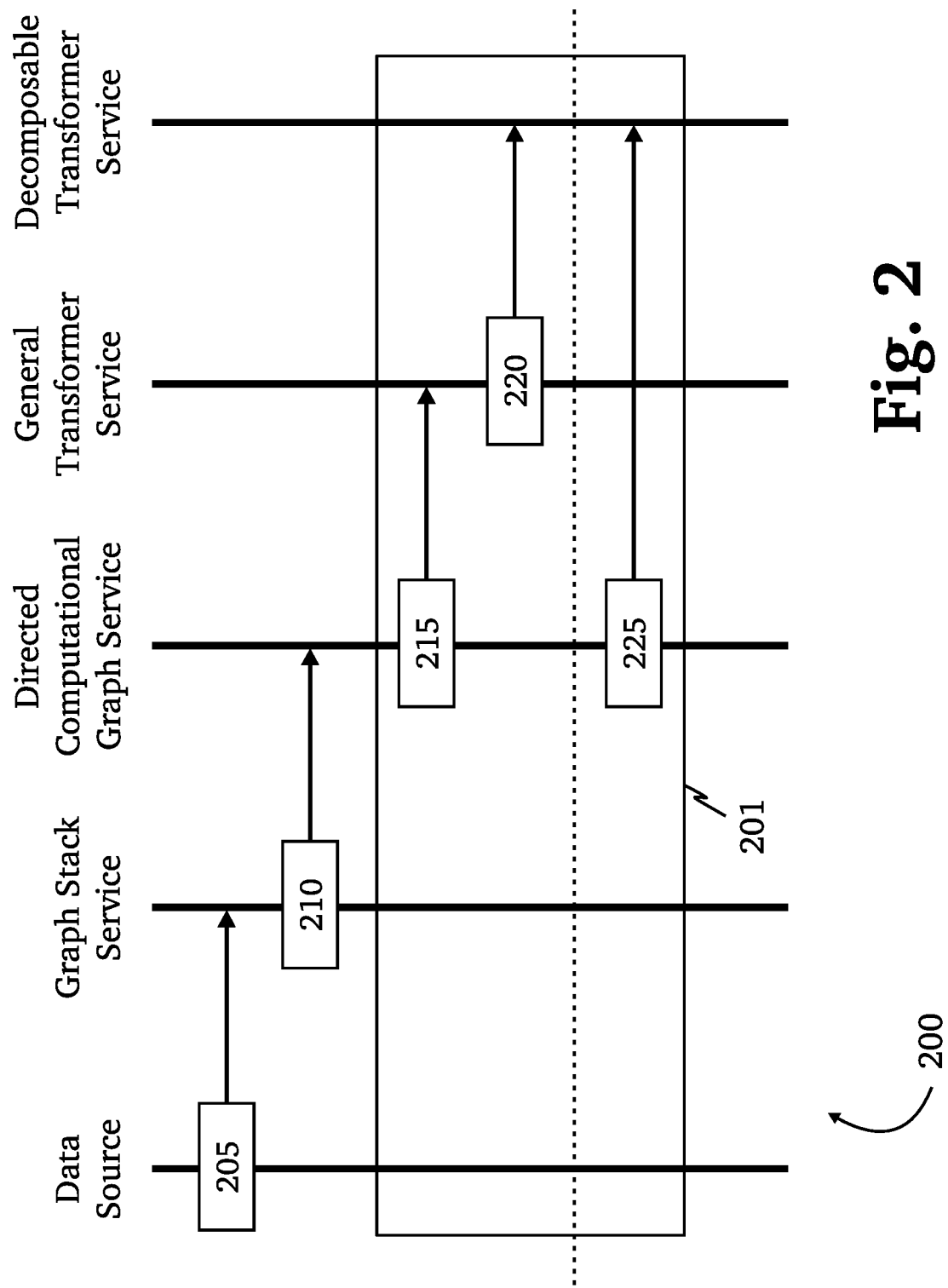
FIG. 2 is a sequence flow diagram summarizing a method for taking data input from a data source to perform analysis and functions with a transformer service as used in various embodiments of the invention.

FIG. 2 is a sequence flow diagram summarizing a method 200 for taking data input from a data source to perform analysis and functions with a transformer service as used in various embodiments of the invention. At an initial step 205, data is input into a system configured to use business operating system 100. The data may be, for example, pre-gathered data, or it may be data that is being gathered in real-time during analysis. The data is queued to a graph stack service module to be converted into directed computational graph (DCG) form. Other examples of data may include, without limitation, data gathered by business operating system 100 and stored in local or cloud data stores; data gathered, and aggregated in real-time via web crawling; large amounts of; user-generated events caused by their actions in an application or website; and the like. At step 210, the data, now in DCG form, is queued to a DCG service module for graphical analysis. Analysis may include the system determining which transformer service the data should be queued to for a best outcome for analysis. At this point, there may be two possible execution paths as indicated by marked box 201. In the first execution path, the DCG data is determined by the DCG service module to be appropriate for general transformer service 160 at step 215. Some examples of data suitable for the general transformer service may include, without limitation, large batches data, data stored on distributed databases such as RIAK, data that is generally suited for linear operations, data gathered and stored from sensors or monitoring software overtime, or the like.

In some cases, there may be an additional step 220. At step 220, during data analysis, there may be decomposable data elements within the general data that may be extracted by business operating system 100 and queued to decomposable transformer service for further analysis.

In the alternate execution path, the input data may be determined to contain data suitable for decomposable transformer service module 150 at step 225. The data is queued directly to the decomposable transformer service module. Some examples of data suitable for the decomposable transformer service module may include, without limitation, live streaming data received from sensors or monitoring software, events caused from user action on a website or app, non-linear operations, new social media postings, and, without a loss of generality, highly parallelizable tasks that don't share state. Besides decomposable data analysis, the real-time data handling capabilities of the decomposable transformer service may be utilized as a maintenance-free backend that may be used for applications, and web development. This may enable a developer to focus on creating their software, and not have to worry building a suitable backend infrastructure and maintaining it.

It will be appreciated by one skilled in the art that the dynamic data analyzing capabilities of this system allows for a multitude of applications for any amount of data. For instance, using the correct model for a particular query the system can handle the data gathering, parsing, and analysis. For example, a data analyst may want to get a sense of what the general public thinks of certain political candidate. The analyst may develop his own model, download a model from a repository, or purchase a model created by another user to use in his system configured to run business operating system 100. The analyst may configure his system to automate data gathering from social media feeds, news feeds, message board postings, and the like. The analyst's system, using the transformer services described herein along with other functions of business operating system 100, may integrate the feeds, map and summarize the data, analyze the sentiment from the gathered data using the model, and generate a report based on the results.

Detailed Description of Exemplary Aspects

Figure 3:
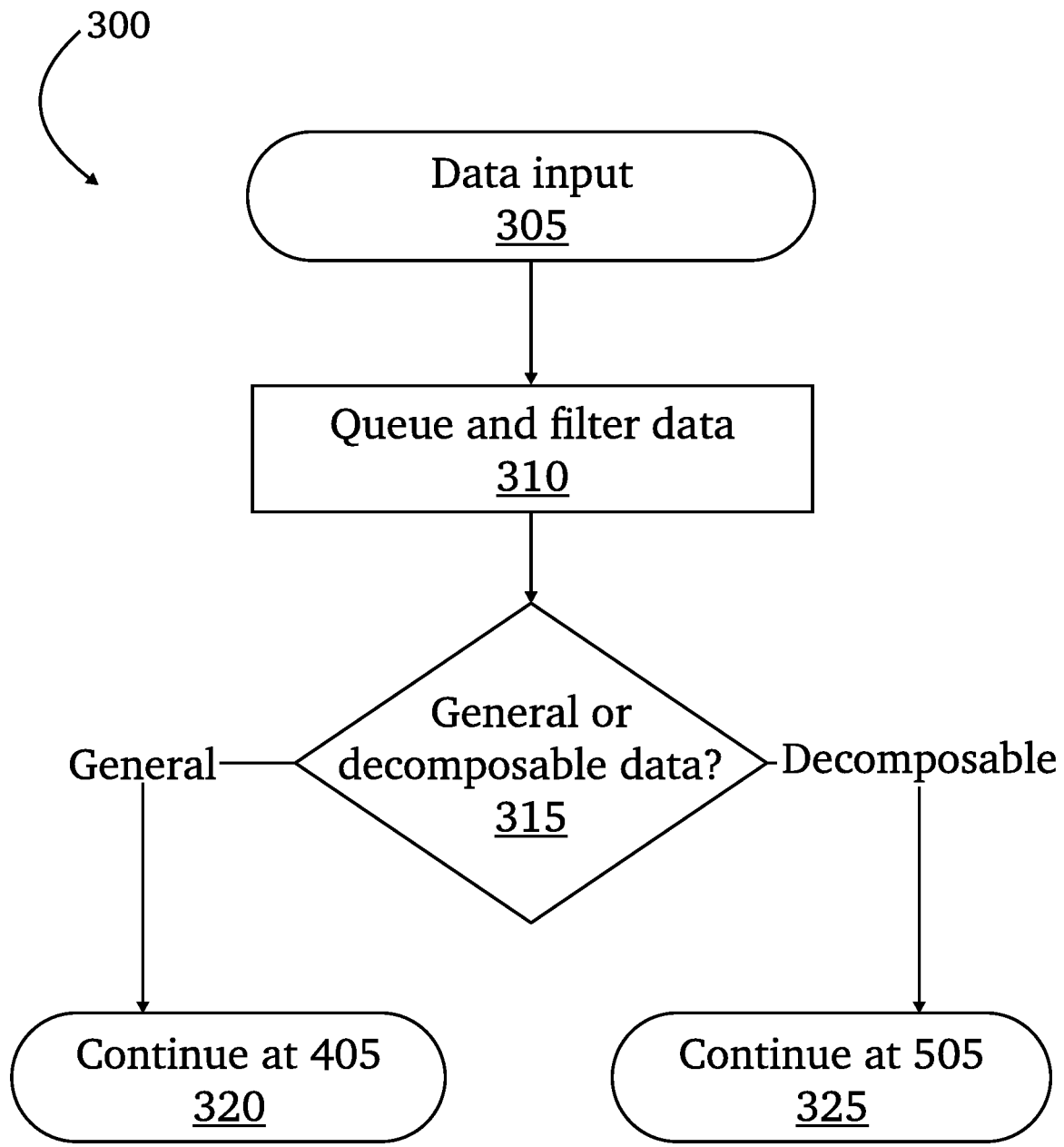
FIG. 3 is a flowchart illustrating a method for data input and splitting for multitemporal data analysis used in various embodiments of the invention.

FIG. 3 is a flowchart illustrating a method 300 for data input and splitting for multitemporal data analysis used in various embodiments of the invention. At an initial step 305, data is input into a system configured to run business operating system 100. As mentioned above, the data may comprise, for instance, user input, previously gathered data, data that is being gathered on-the-fly in real-time, or the like. The data may also be a combination of the multiple types previously mentioned. At step 310, the input data is queued, and filtered by the system to collect the relevant parts of the data. At step 315, using DCG analysis, the system may split the data, and determine the type of data and the most appropriate module for further analysis depending on degree of shared state information as part of a declarative formalism for message passing between atomic workers (computing instances) in the pool of distributed computing resources. If the data is determined to be appropriate for the general transformer service module, step 320 is reached, wherein the process continues at step 405 in method 400, which is discussed below. On the other hand, if the data is determined to be appropriate for the decomposable transformer service module, step 325 is reached, wherein the process may continue at step 505 in method 500, which is also discussed below.

Figure 4:
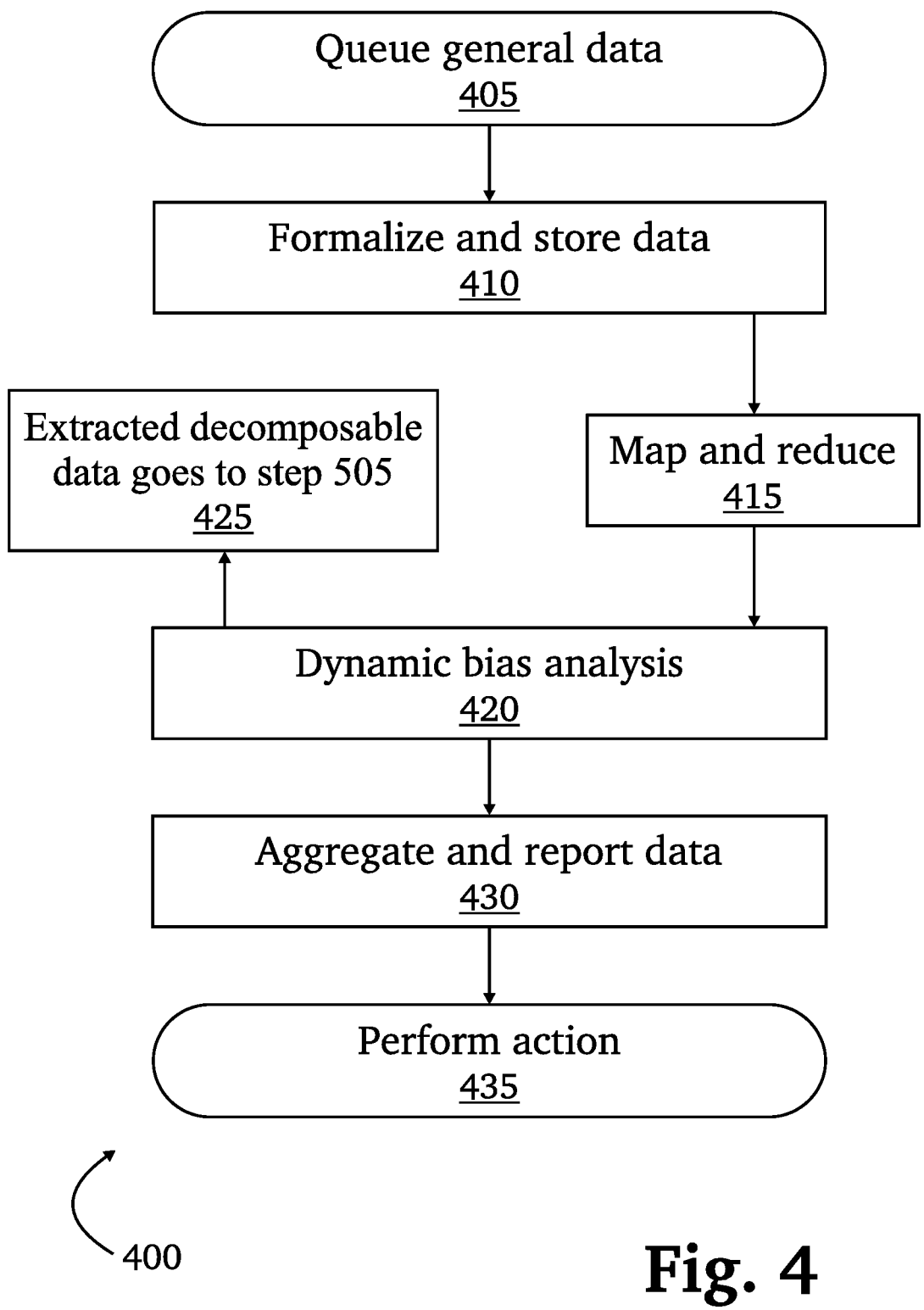
FIG. 4 is a flowchart illustrating a method for analyzing data using a general transformer service module as used in various embodiments of the invention.

FIG. 4 is a flowchart illustrating a method 400 for analyzing data using a general transformer service module as used in various embodiments of the invention. At an initial step 405, general data is queued. One source of data is discussed in method 300. At step 410, the data is formalized into an efficient, database-friendly format and stored for processing. Storage may be handled by a distributed database solution such as RIAK. At step 415, the data is broken up and mapped to a metric specified by a user, and the mapped data is summarized based at least in part by the specified metric. At step 420, further leveraging the DCG service module for analysis, biases in the data may be determined. Any decomposable elements in the data at split off and queued to the decomposable transformer service module to step 425, a method in which is discussed below in FIG. 5. While step 425 is occurring, the general data is aggregated and compiled into a report at step 430. At step 435, the system may perform an action pre-configured by a user. Actions may include, for instance, a program function, sending an alert, activating a trigger, or the like.

Figure 5:
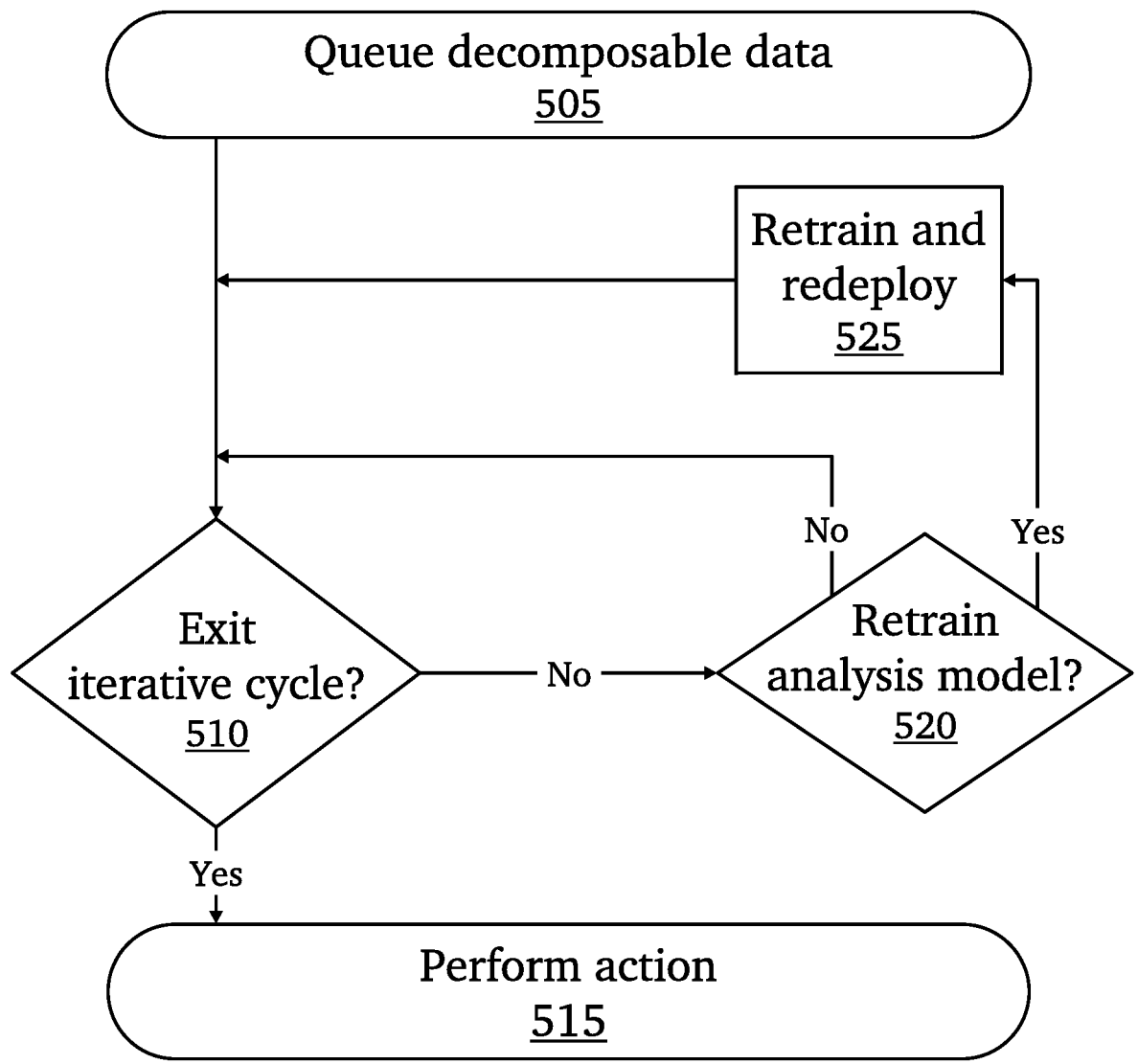
FIG. 5 is a flowchart illustrating a method for analyzing decomposable data with a decomposable transformer service module as used in various embodiments of the invention.

FIG. 5 is a flowchart illustrating a method 500 for analyzing decomposable data with a decomposable transformer service module as used in various embodiments of the invention. At an initial step 505, decomposable data is queued at the decomposable transformer service module. At step 510, the system determines whether the operation should remain in an iterative loop. The loop may terminate, for example, when there is no more data to analyze, when a trigger is activated, when an alert is received, or a pre-specified event has occurred. If no more iterations are required, the cycle terminates, and an action is performed at step 515. As mentioned above, actions may include, for instance, a program function, sending an alert, activating a trigger, or the like.

On the other hand, if the iterative cycle is still required, the system determines whether the model used for analysis should be retrained with the iterative data at step 520. If the system is determined to be stable, and the model does not need to be retrained, the system does another check to see whether it should remain in the iterative cycle. Otherwise, if the model is determined to require retraining, the iterated data is used to retrain the analysis model and redeployed at step 525, before doing another iterative cycle check.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 6:
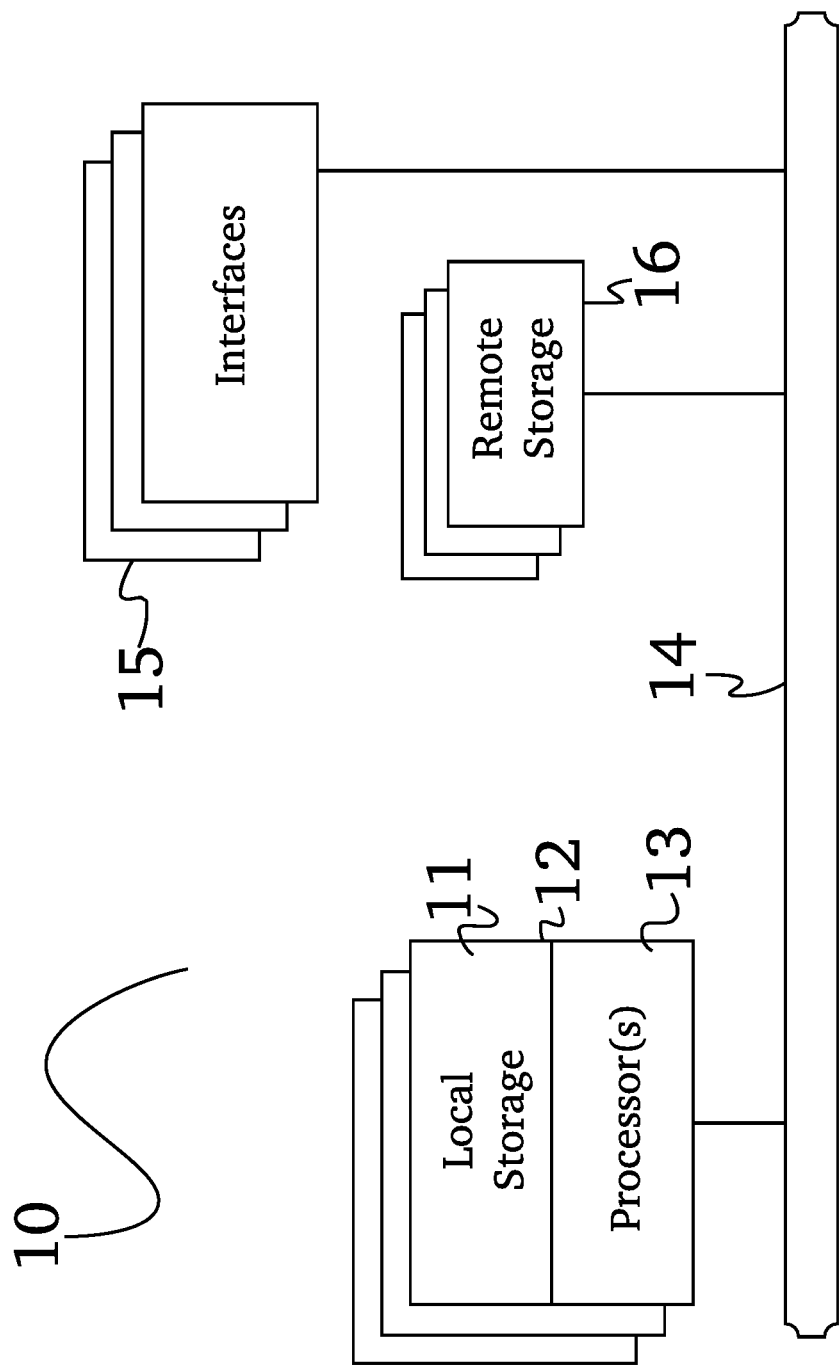
FIG. 6 is a block diagram illustrating an exemplary hardware architecture of a computing device used in various embodiments of the invention.

Referring now to FIG. 6, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/N hardware interfaces) and, in some instances, volatile and/or non-volatile memory (e.g., RAM).

Although the system shown in FIG. 6 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 7:
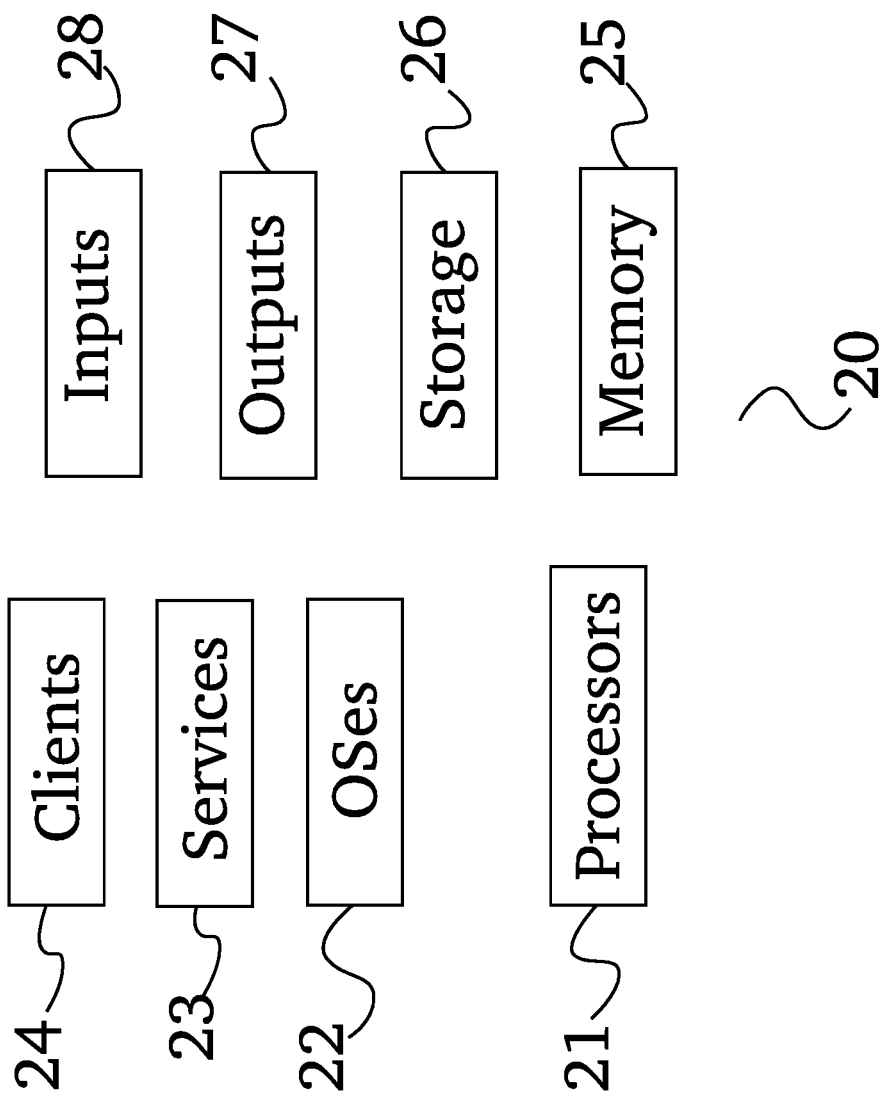
FIG. 7 is a block diagram illustrating an exemplary logical architecture for a client device, according to various embodiments of the invention.

In some aspects, systems may be implemented on a standalone computing system. Referring now to FIG. 7, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 6). Examples of storage devices 26 include flash memory, magnetic hard drive, CD-ROM, and/or the like.

Figure 8:
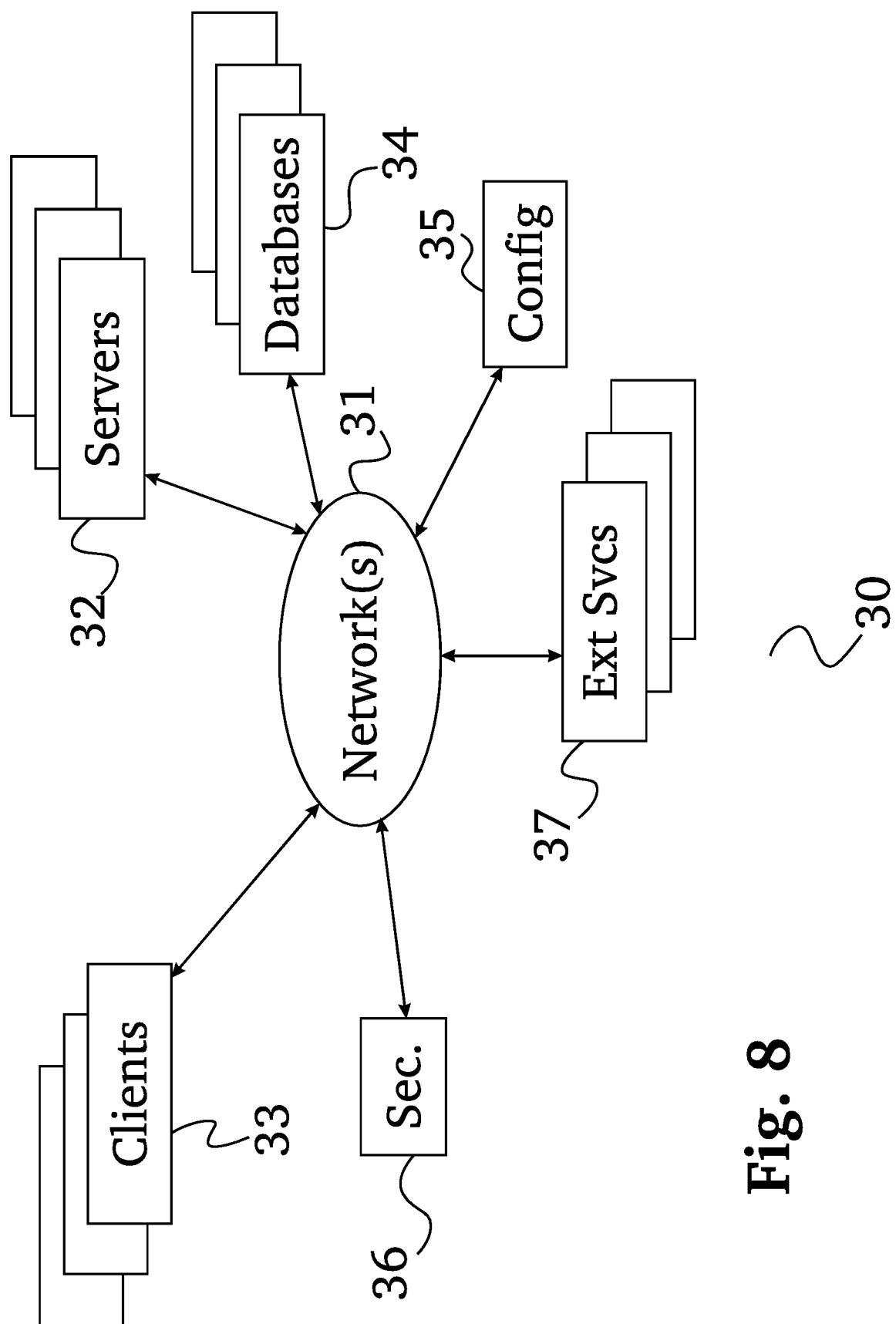
FIG. 8 is a block diagram illustrating an exemplary architectural arrangement of clients, servers, and external services, according to various embodiments of the invention.

In some aspects, systems may be implemented on a distributed computing network, such as one having any number of clients and/or servers. Referring now to FIG. 8, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 7. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 9:
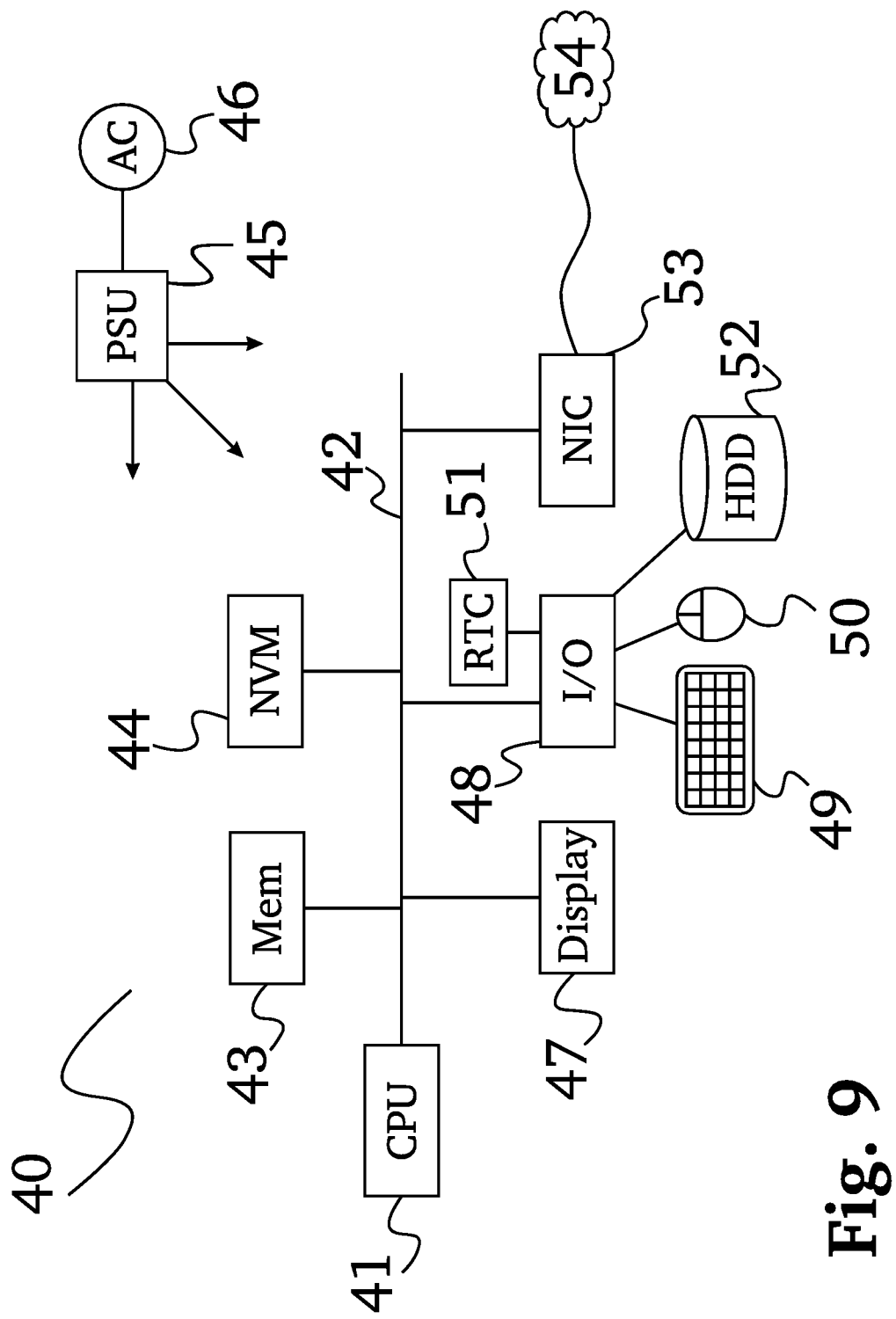
FIG. 9 is another block diagram illustrating an exemplary hardware architecture of a computing device used in various embodiments of the invention.

FIG. 9 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for multitemporal data analysis, comprising:
   a computing device comprising a memory, a processor, and a non-volatile data storage device;
   a directed computational graph service module comprising a first plurality of programming instructions stored in the memory and operable on the processor, wherein the first plurality of programming instructions, when operating on the processor, causes the computing device to:
      receive input data, the input data comprising a combination of stored data and streaming data;
      convert the input data into a directed computational graph, wherein:
         the directed computational graph comprises nodes representing data transformations and edges representing messaging between the nodes;
         the data transformation of each node is shared among a plurality of instantiated workers; and
         the nodes, edges, and instantiated workers of the directed computational graph represent state information for processing of the input data; analyze the directed computational graph to determine whether to batch process or real-time process portions of the input data based on measuring shared state information among the nodes, edges, and instantiated workers of the directed computational graph; and
      reorganize the input data into batch processing data for queueing to a general transformer service module or real-time processing data for queueing to a decomposable transformer service module based on the analysis of the directed computational graph;
   a general transformer service module comprising a memory, a processor, and a plurality of programming instructions stored in the memory thereof and operable on the processor thereof, wherein the programmable instructions, when operating on the processor, cause the processor to:
      receive the batch processing data from the directed computational graph service module; and
      perform batch processing of the batch processing data according to a pre-determined first data processing workflow; and
   a decomposable transformer service module comprising a memory, a processor, and a plurality of programming instructions stored in the memory thereof and operable on the processor thereof, wherein the programmable instructions, when operating on the processor, cause the processor to:
      receive the real-time processing data from the directed computational graph service module; and
      perform real-time processing of the real-time processing data according to a pre-determined second data processing workflow.

2. The system of claim 1, wherein a function is executed based at least in part by the results of data processing by the general transformer service module and decomposable transformer service module.

3. The system of claim 1, wherein at least a portion of the input data comes from a social media source.

4. The system of claim 1, wherein at least a portion of the data input into the system comes from actions of a user while using an application.

5. The system of claim 1, wherein at least a portion of the input data from a news outlet.

6. The system of claim 1, wherein at least a portion of the input data comes from a distributed database.

7. A method for multitemporal data analysis, comprising the steps of:
   receiving input data, using a directed computation graph service module operating on a computing device, the input data comprising a combination of stored data and streaming data;
   converting the input data into a directed computational graph, wherein:
      the directed computational graph comprises nodes representing data transformations and edges representing messaging between the nodes;
      the data transformation of each node is shared among a plurality of instantiated workers; and
      the nodes, edges, and instantiated workers of the directed computational graph represent state information for processing of the input data; analyzing, using the directed computational graph module, the directed computational graph to determine whether to batch process or real-time process portions of the input data based on measuring shared state information among the nodes, edges, and instantiated workers of the directed computational graph;
   reorganizing, using the directed computational graph module, the input data into batch processing data for queueing to a general transformer service module or real-time processing data for queueing to a decomposable transformer service module based at least in part by analysis of the input data;
   receiving the batch processing data from the directed computation graph service module, using a general transformer service module operating on the computing device;
   performing batch processing of the batch processing data according to a pre-determined first data processing workflow, using the general transformer service module;
   receiving the real-time processing data from the directed computation graph service module, using a decomposable transformer service module operating on the computing device; and
   performing real-time processing of the real-time data according to a pre-determined second data processing workflow, using the decomposable transformer service module.

8. The method of claim 7, wherein a function is executed based at least in part by the results of data processing by the general transformer service module and decomposable transformer service module.

9. The method of claim 7, wherein at least a portion of the input data comes from a social media source.

10. The method of claim 7, wherein at least a portion of the input data comes from actions of a user while using an application.

11. The method of claim 7, wherein at least a portion of the input data comes from a news outlet.

12. The method of claim 7, wherein at least a portion of the input data comes from a distributed database.

* * * * *